(12) United States Patent
Yoshida

(10) Patent No.: US 8,237,983 B2
(45) Date of Patent: Aug. 7, 2012

(54) INFORMATION INPUT OUTPUT METHOD USING DOT PATTERN

(76) Inventor: Kenji Yoshida, Tokyo (JP)

( * ) Notice: Subject to any disclaimer, the term of this patent is extended or adjusted under 35 U.S.C. 154(b) by 1268 days.

(21) Appl. No.: 11/794,174

(22) PCT Filed: Dec. 28, 2004

(86) PCT No.: PCT/JP2004/019613
§ 371 (c)(1),
(2), (4) Date: Jun. 26, 2007

(87) PCT Pub. No.: WO2006/070458
PCT Pub. Date: Jul. 6, 2006

(65) Prior Publication Data
US 2008/0043258 A1 Feb. 21, 2008

(51) Int. Cl.
*G06F 15/00* (2006.01)
*G06K 1/00* (2006.01)
*G06K 15/00* (2006.01)

(52) U.S. Cl. .......................................... 358/1.8; 358/1.6
(58) Field of Classification Search .................... 358/1.8, 358/1.9
See application file for complete search history.

(56) References Cited

U.S. PATENT DOCUMENTS

| | | | |
|---|---|---|---|
| 6,133,927 A * | 10/2000 | Arai et al. ...................... | 347/131 |
| 6,460,155 B1 | 10/2002 | Nagasaki et al. | |
| 6,548,768 B1 | 4/2003 | Pettersson et al. | |
| 6,633,008 B2 | 10/2003 | Johnson | |
| 6,633,526 B1 | 10/2003 | Imade et al. | |
| 6,674,427 B1 | 1/2004 | Pettersson et al. | |
| 7,475,824 B2 * | 1/2009 | Yoshida ......................... | 235/494 |
| 8,031,375 B2 | 10/2011 | Yoshida | |
| 2005/0173544 A1 | 8/2005 | Yoshida | |

(Continued)

FOREIGN PATENT DOCUMENTS

EP  1833001 A1  9/2007

(Continued)

OTHER PUBLICATIONS

Russian Office Action dated Nov. 17, 2008 (mailing date), issued in corresponding Russian Patent Application No. 2007128915/09(031489).

(Continued)

*Primary Examiner* — Douglas Tran
(74) *Attorney, Agent, or Firm* — Westerman, Hattori, Daniels & Adrian, LLP

(57) ABSTRACT

A quadrangular or rectangular area on a medium surface of a printed material and the like is defined as a block. A straight line in a vertical direction and a horizontal direction nuclear along an edge of the block is defined as a reference grid line. A virtual grid point is placed at a predetermined interval on the reference grid line. A reference grid point dot is placed each on a virtual grid point on the horizontal reference grid lines. A straight line connecting the reference grid point dots and virtual grid points on a vertical line is defined as a grid line. An intersection point of grid lines is defined as a virtual grid point. A dot pattern is generated by arranging one or more information dots having a distance and a direction on the base of the virtual grid point. An optical reading means is used to scan the dot pattern into image information. Then, the dot pattern is converted into a numerical value, and the information corresponding to the numerical information is read from a storage means and output.

24 Claims, 14 Drawing Sheets

U.S. PATENT DOCUMENTS

2006/0154559 A1 7/2006 Yoshida

FOREIGN PATENT DOCUMENTS

| EP | 1876555 A1 | 1/2008 |
|---|---|---|
| JP | 10-187907 A | 7/1998 |
| JP | 2003-511761 A | 3/2003 |
| RU | 2126598 C1 | 2/1999 |
| WO | 95/14346 A1 | 5/1995 |
| WO | 02/23464 A1 | 3/2002 |
| WO | 03/049023 A1 | 6/2003 |
| WO | 2004-029871 A1 | 4/2004 |
| WO | 2004/084125 A1 | 9/2004 |

OTHER PUBLICATIONS

Russian Office Action dated Jan. 19, 2009, issued in corresponding Russian Patent Application No. 2007128915/09(031489).

International Search Report of PCT/JP2004/019613, date of mailing Apr. 12, 2005.

International Preliminary Report dated Jul. 30, 2007 issued in corresponding PCT Application No. PCT/JP2004/019613 (Form PCT/IB/373 and Form PCT/ISA/237).

European Office Action dated Jun. 18, 2010 issued in corresponding European Patent Application No. 05737287.2.

International Preliminary Report on Patentability dated Oct. 30, 2007, issued in corresponding PCT Application No. PCT/JP2005/008210 (Form PCT/IB/373 and Form PCT/ISA/237).

International Search Report of PCT/JP2005/008210, date of mailing Aug. 16, 2005.

Russian Office Action dated Apr. 28, 2005, issued in corresponding Russian Patent Application No. 2007-144103.

Office Action dated Jan. 13, 2012, issued in copending related U.S. Appl. No. 13/251,903.

Notice of Allowance dated Apr. 25, 2012, issued in related U.S. Appl. No. 13/251,903.

* cited by examiner (a)

(b)

(c)

(a)　　　　　　　　(b)　　　　　　　　(c)

00100001　　　　01100110　　　　11010101

(a)

(b)

(a)

(b)

(a)

(b)

$\boxed{2} = {}_1⑤_1 - {}_1②_1 = {}_1⑤_2 - {}_1②_2 = {}_2⑤_1 - {}_2②_1 = {}_2⑤_2 - {}_2②_2$ $\boxed{3} = {}_1⑥_1 - {}_1③_1 = {}_1⑥_2 - {}_1③_2 = {}_2⑥_1 - {}_2③_1 = {}_2⑥_2 - {}_2③_2$ $\boxed{4} = {}_1⑦_1 - {}_1④_1 = {}_1⑦_2 - {}_1④_2 = {}_2⑦_1 - {}_2④_1 = {}_2⑦_2 - {}_2④_2$ $\boxed{5} = {}_1⑧_1 - {}_1⑤_1 = {}_1⑧_2 - {}_1⑤_2 = {}_2⑧_1 - {}_2⑤_1 = {}_2⑧_2 - {}_2⑤_2$ $\boxed{6} = {}_1⑨_1 - {}_1⑥_1 = {}_1⑨_2 - {}_1⑥_2 = {}_2⑨_1 - {}_2⑥_1 = {}_2⑨_2 - {}_2⑥_2$ $\boxed{7} = {}_1⑩_1 - {}_1⑦_1 = {}_1⑩_2 - {}_1⑦_2 = {}_2⑩_1 - {}_2⑦_1 = {}_2⑩_2 - {}_2⑦_2$ $\boxed{8} = {}_1⑪_1 - {}_1⑧_1 = {}_1⑪_2 - {}_1⑧_2 = {}_2⑪_1 - {}_2⑧_1 = {}_2⑪_2 - {}_2⑧_2$ $\boxed{9} = {}_1⑫_1 - {}_1⑨_1 = {}_1⑫_2 - {}_1⑨_2 = {}_2⑫_1 - {}_2⑨_1 = {}_2⑫_2 - {}_2⑨_2$ $\boxed{10} = {}_1①_2 - {}_1⑩_1 = {}_1①_3 - {}_1⑩_2 = {}_2①_2 - {}_2⑩_1 = {}_2①_3 - {}_2⑩_2$ $\boxed{11} = {}_1②_2 - {}_1⑪_1 = {}_1②_3 - {}_1⑪_2 = {}_2②_2 - {}_2⑪_1 = {}_2②_3 - {}_2⑪_2$ $\boxed{12} = {}_1③_2 - {}_1⑫_1 = {}_1③_3 - {}_1⑫_2 = {}_2③_2 - {}_2⑫_1 = {}_2③_3 - {}_2⑫_2$ $☐ = {_1}②_1 - {_1}①_1 = {_1}②_2 - {_1}①_2 = {_2}②_1 - {_2}①_1 = {_2}②_2 - {_2}①_2$ $② = {_1}③_1 - {_1}②_1 = {_1}③_2 - {_1}②_2 = {_2}③_1 - {_2}②_1 = {_2}③_2 - {_2}②_2$ $③ = {_1}④_1 - {_1}③_1 = {_1}④_2 - {_1}③_2 = {_2}④_1 - {_2}③_1 = {_2}④_2 - {_2}③_2$ $④ = {_1}①_2 - {_1}④_1 = {_1}①_3 - {_1}④_2 = {_2}①_2 - {_2}④_1 = {_2}①_3 - {_2}④_2$ $⑤ = {_1}⑥_1 - {_1}⑤_1 = {_1}⑥_2 - {_1}⑤_2 = {_2}⑥_1 - {_2}⑤_1 = {_2}⑥_2 - {_2}⑤_2$ $⑥ = {_1}⑦_1 - {_1}⑥_1 = {_1}⑦_2 - {_1}⑥_2 = {_2}⑦_1 - {_2}⑥_1 = {_2}⑦_2 - {_2}⑥_2$ $⑦ = {_1}⑧_1 - {_1}⑦_1 = {_1}⑧_2 - {_1}⑦_2 = {_2}⑧_1 - {_2}⑦_1 = {_2}⑧_2 - {_2}⑦_2$ $⑧ = {_1}⑤_2 - {_1}⑧_1 = {_1}⑤_3 - {_1}⑧_2 = {_2}⑤_2 - {_2}⑧_1 = {_2}⑤_3 - {_2}⑧_2$ (a)

(b)

(a)

(b)

INFORMATION INPUT OUTPUT METHOD USING DOT PATTERN

DETAILED DESCRIPTION OF THE INVENTION

1. Technical Field of the Invention

The present invention relates to an information input output method using a dot pattern for inputting and outputting various information and programs by optically scanning dot pattern information formed on a printed material and the like.

2. Background Art

There has been proposed an information input output method for outputting audio information and the like by scanning a bar code printed on a printed material and the like. For example, a method has been proposed to store information corresponding to a given key in a storage means, and retrieve the information corresponding to the key scanned by a bar code reader. In addition, a technique has been proposed to generate a dot pattern in which fine dots are arranged based on a predetermined rule to output many information and programs, use a camera to scan the dot pattern printed on a printed material into image data, and digitize the data to output audio information.

However, the aforementioned conventional method of using a bar code to output audio information and the like has a problem in that a bar code printed on a printed material and the like may obstruct the view. There is another problem in that, when a bar code is large enough to occupy a part of the paper, it is substantially impossible to arrange many bar codes in a limited layout space with each bar code placed in part of text or a sentence or for each meaningful character and other object appearing in an image such as a photograph, a picture, and a graphic so as to be easily viewed.

A camera is used to capture a dot pattern as image data which is digitized into an achromatic 256-gray-scale image, and then a change in gray scale is differentiated to recognize a dot. The differential coefficient is compared with a predetermined threshold value to obtain a dot edge. Then, the 256-gray-scale data is converted to binary data indicating white or black. This binary conversion may lead to a dot print error due to a printing blur or misalignment, or pixilation misalignment when dots are printed on paper. Conventionally, these printing errors are checked by parity checking. However, this error checking has a problem in that a specific dot causing a printing error cannot be identified and imaging range must be broadened because error checking is performed on a chunk of data containing a plurality of dots instead of individual dot.

Another problem lies in that, lens distortion, oblique imaging, expansion and contraction of paper, curved surface of a medium surface, and distortion at the time of printing may cause a dot pattern to be distorted, thereby requiring an advanced technique for correcting the distortions.

The present invention is provided to solve these problems. It is an object of the present invention to provide a technique in which a dot pattern to be displayed on a printed material and the like can be placed based on a new rule to define a large amount of data.

DISCLOSURE OF THE INVENTION

A first aspect of the present invention is an information output method using a dot pattern, wherein a quadrangular or rectangular area on a medium surface of a printed material and the like is defined as a block; a straight line in a vertical direction and a horizontal direction each along an edge of the block is defined as a reference grid line; a virtual grid point is placed at a predetermined interval on the reference grid line; a reference grid point dot is placed on a virtual grid point on the horizontal reference grid lines; a straight line connecting the reference grid point dots and virtual grid points on a vertical line is defined as a grid line; an intersection point of grid lines is defined as a virtual grid point; and one or more information dots having a distance and a direction on the base of the virtual grid point are arranged to form a dot pattern, the method comprising: generating the dot pattern; scanning the dot pattern into image information by an optical reading means; converting the dot pattern into a numerical value; and reading and outputting the information corresponding to the numerical information from a storage means.

According to this method, a dot pattern capable of defining a large amount of information can be generated by placing an information dot on the base of a virtual grid point in an area between the upper and lower reference grid lines configuring an upper edge and a lower edge of a quadrangular block.

A second aspect of the present invention is an information input output method using a dot pattern, according to the first aspect thereof, wherein a sub-reference grid point dot in stead of the information dot is placed on the virtual grid point on a grid line which is parallel to the reference grid line horizontal to a reference block and is placed at a predetermined interval from the reference grid line in the block.

Use of a sub-reference grid point allows even low precision data to be used to easily identify a grid line and accurately calculate positional relation of an information dot from a virtual grid point. More specifically, use of a sub-reference grid point dot enables analysis for any misalignment of dots printed on a medium surface (paper), centering errors of digitized dots, folding of a print surface, and deformation of a dot pattern shot in an oblique direction by an optical reading means.

A third aspect of the present invention is an information input output method using a dot pattern, according to one of the first and second aspects thereof, wherein at least one of the reference grid dots or sub-reference grid dots constituting the block is displaced from a virtual grid point and is used as a key dot in which the displacement direction to the block and the configuration of the block are defined.

Use of a key dot allows the optical reading means to recognize the direction of a dot pattern. Thus, a larger amount of information can be defined as a dot pattern by changing the meaning of an information dot read for each direction.

A fourth aspect of the present invention is an information input output method using a dot pattern, according to one of the first to third aspects thereof, wherein a numerical difference between horizontally adjacent information dots in the information dot is calculated into numerical information to output an information group enumerating the numerical information in the block.

A fifth aspect of the present invention is an information input output method using a dot pattern, according to one of the first to fourth aspects thereof, wherein the block is arranged consecutively in any area vertically and horizontally, and the reference grid dot is shared horizontally by each block.

A larger amount of information can be placed in a smaller area by sharing a reference grid dot.

In addition, same data is defined for each block in any area so that, when the optical reading means shoots anywhere in the area, the same data can be obtained. Further, the X and Y coordinates are defined for each block so as to use the optical reading means as a coordinate indicating means such as a digitizer and a tablet.

A sixth aspect of the present invention is an information input output method using a dot pattern, according to the fourth and fifth aspects thereof, wherein a reference grid dot and an information dot at left and right ends of the block are shared in a dot pattern placed consecutively in the area, and in the dot pattern in which a numerical difference between horizontally adjacent information dots is calculated to define numerical information between information dots, an initial value of an information dot at a horizontal end in the area is determined by any random number.

This method also allows a larger amount of information to be placed in a smaller area by sharing a reference grid dot.

Repetition of an uneven distribution of a dot in the same position can be prevented by applying a dot placement algorithm using a difference method to a dot pattern placed consecutively in an area. Thus, visual recognition of a blurred pattern and the like due to repetition of an uneven distribution of a dot in the same position can be prevented.

A seventh aspect of the present invention is an information input output method using a dot pattern, according to the third to sixth aspects thereof, wherein the key dot is placed on at least one of the four corners of a block.

According to this method, a key dot is placed in any position on the four corners of a block to partition one block of data analytically and visually, thus facilitating generation and management of data.

An eighth aspect of the present invention is an information input output method using a dot pattern, according to one of the first to seventh aspects thereof, wherein information in an information dot of the block is defined by using a position of the information dot in the block to arbitrarily limit the distance and the direction from the virtual grid point for each information dot.

This method allows information to be defined by arbitrarily limiting the distance and the direction from a virtual grid point, and a dot pattern in accordance with the present invention can be used by limiting the application, so as to ensure security of each other. More specifically, limitedly defined information can be read only by its corresponding optical reading means.

BEST MODE FOR CARRYING OUT THE INVENTION

Hereinafter, embodiments of the present invention will be described with reference to the accompanying drawings.

Figure 1:
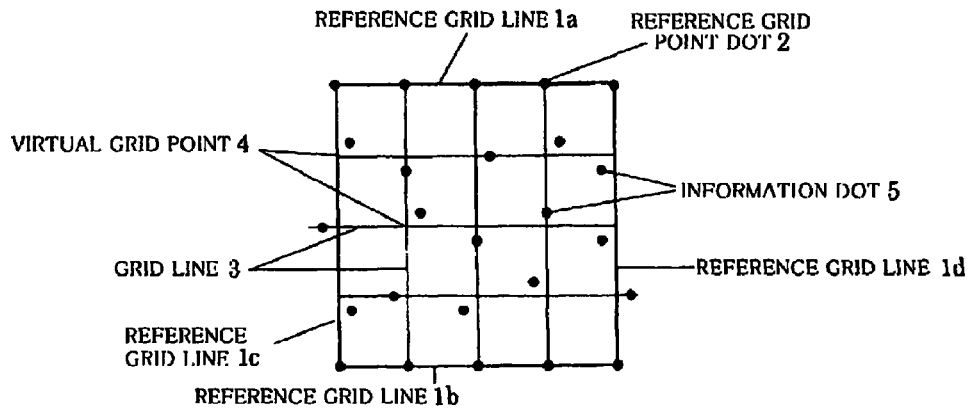
FIG. 1 shows dot patterns in accordance with an embodiment of the present invention: (a) 5 blocks×5 blocks, (b) 6 blocks×5 blocks, and (b) 7 blocks×5 blocks.
Figure 1:
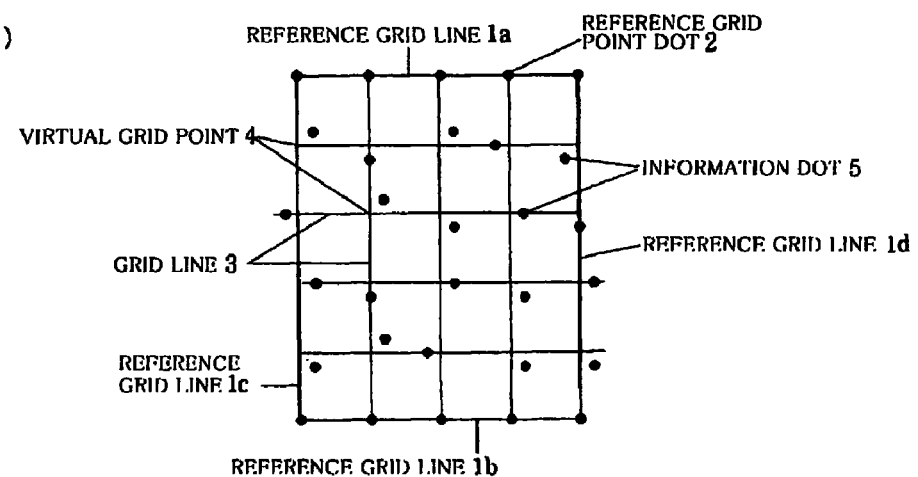
Figure 1:
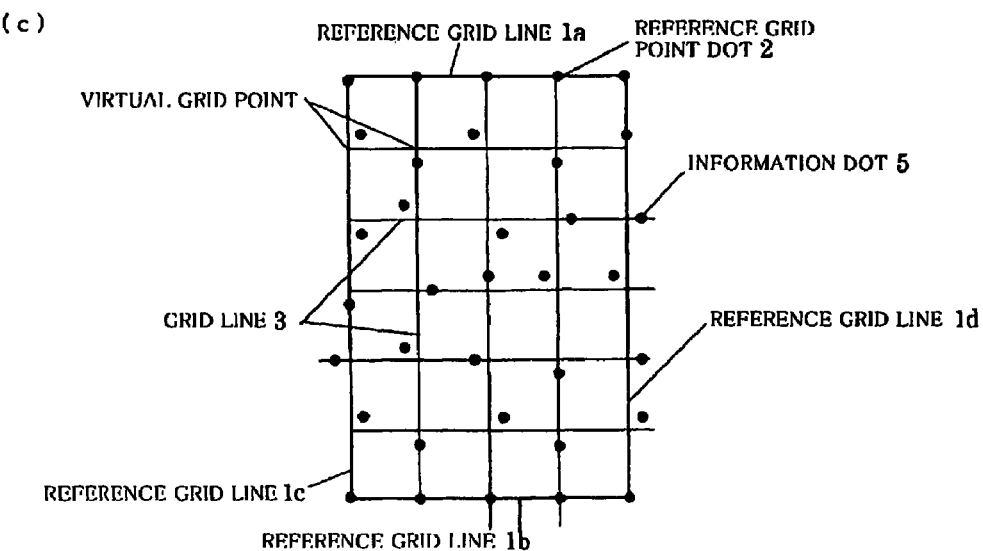

FIG. 1 shows exemplary dot patterns in accordance with an embodiment of the present invention: (a) 4×4 grids, (b) 5×4 grids, and (c) 6×4 grids.

With reference to FIG. 1(a), reference grid lines $1a$ to $1d$ are drawn horizontally or vertically along the quadrangle, and a virtual grid point 4 is placed at a predetermined interval within the quadrangle.

Note that reference grid lines $1a$ to $1d$ and virtual grid points 4 are not actually printed on paper, but virtually set in computer image memory when dot patterns are placed or read.

Next, a reference grid dot 2 is placed each on a virtual grid point 4 on upper and lower horizontal reference grid lines $1a$ and $1b$.

Next, a line connecting virtual grid points 4 is assumed as a grid line 3, and an intersection point of the grid lines 3 is assumed as a virtual grid point 4.

Next, one or more information dots 5, each having a distance and a direction from a virtual grid point 4, are placed for each virtual grid point 4 to form a dot pattern. It should be noted that one information dot 5 is placed for each virtual grid point 4 in FIG. 1.

As described above, FIG. 1(a) shows that information dots are placed with four grids in the vertical direction and four grids in the horizontal direction (4×4 grids), (b) 5×4 grids, and (c) 6×4 grids. It should be noted that any number of grids including and exceeding 2×1 grids can be placed.

Figure 2:
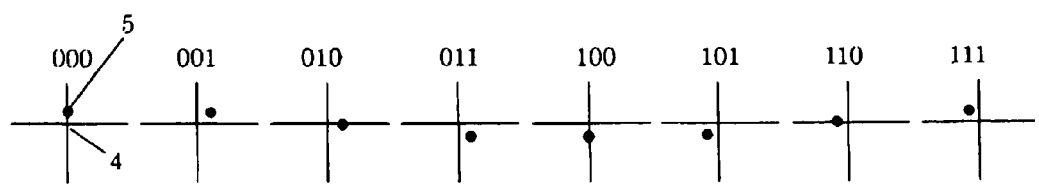
FIG. 2 is a drawing (1) showing the definition of information of a dot pattern.

FIG. 2 shows how to define an information dot. The value of an information dot is defined depending on the direction from a virtual grid point 4. More specifically, an information dot can be placed on one of the eight points, each shifted 45 degrees clockwise on a grid line 3 passing through a virtual grid point 4 so as to define a total of eight different information dots (000 to 111 in binary notation, three bits).

Figure 3:
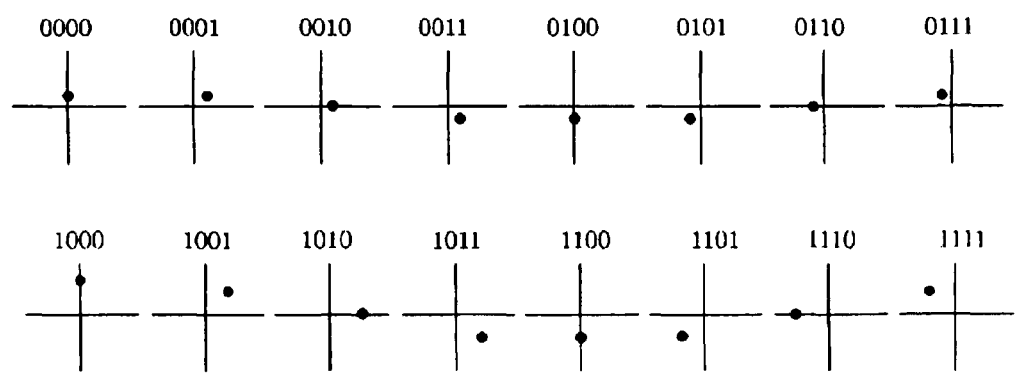
FIG. 3 is a drawing (2) showing the definition of information of a dot pattern.

With reference to FIG. 3, a two-step distance is provided, each in the same direction as described above to define a total of 16 different information dots (0000 to 1111 in binary notation, four bits).

Figure 4:
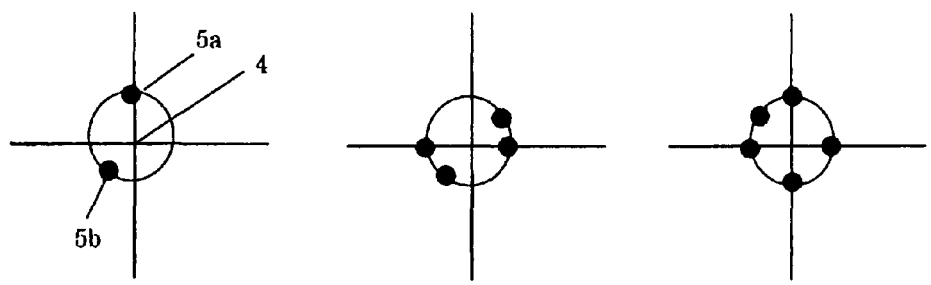
FIG. 4 is a drawing (3) showing the definition of information of a dot pattern.

With reference to FIG. 4, a plurality of information dots 5 are placed concentrically around a virtual grid point 4. If a dot is present in a concentric ring, 1 is defined, and if not, 0 is defined so as to define a total of eight bits. Thus, a dot placed in a vertical direction is defined as a first bit, and then subsequent bit information is defined clockwise.

Figure 5:
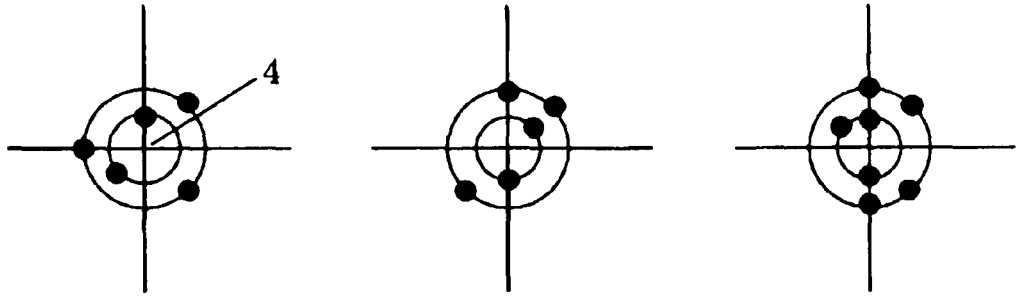
FIG. 5 is a drawing (4) showing the definition of information of a dot pattern.

With reference to FIG. 5, the aforementioned concentric circle is doubled to define a total of 16 bits. This structure allows a large amount of information to be defined for a virtual grid point 4.

Figure 6:
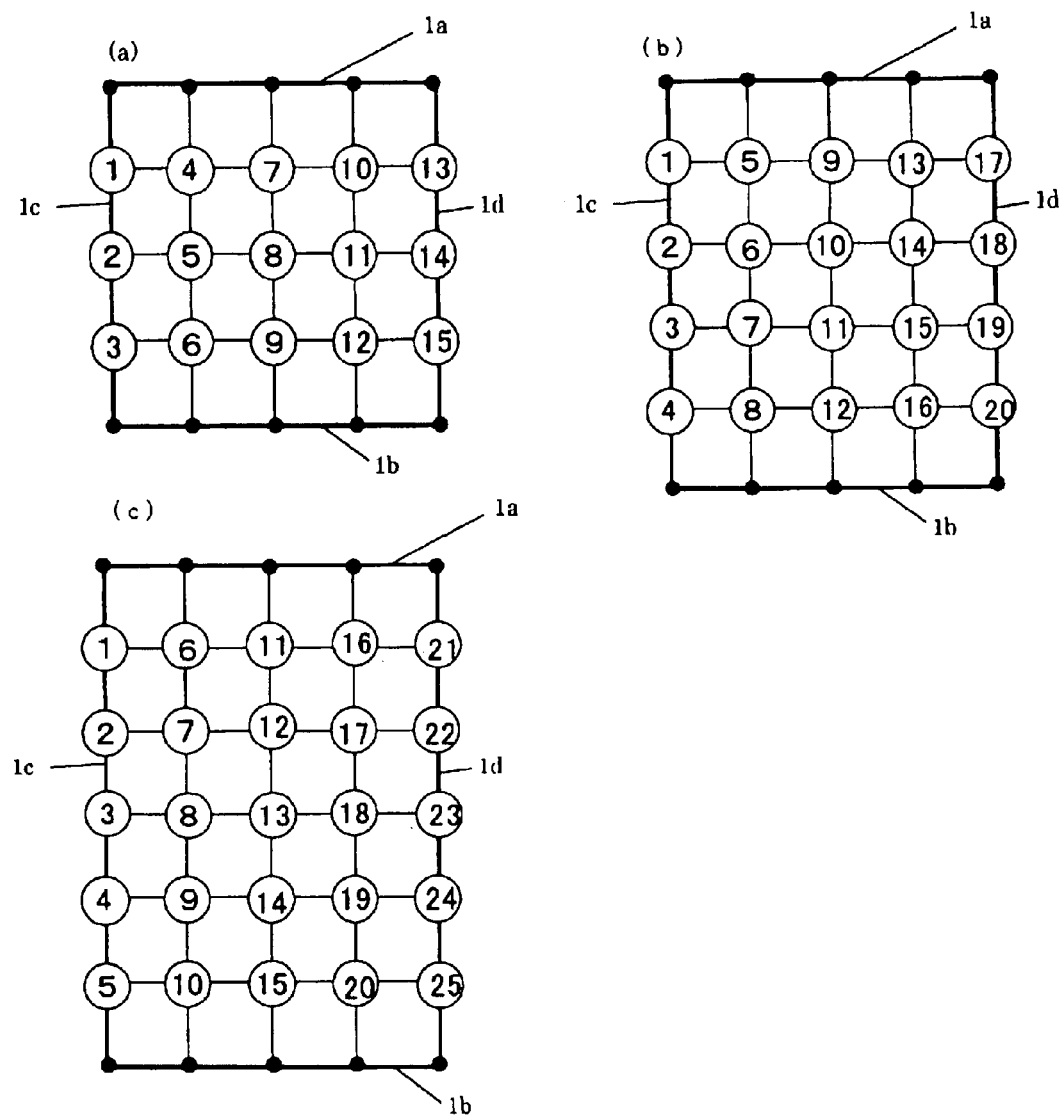
FIG. 6 is an explanatory drawing (1), each showing a dot reading order.

FIG. 6 explains the order for an optical reading means to read information dots. The circled numbers in the FIG. 6 are used just for convenience, and in actuality correspond to dot patterns shown in FIGS. 1(a) to (c).

With reference to FIG. 6(a), scanning starts with the left-most vertical reference grid line 1c to read an information dot 5 for each virtual grid point 4 (circled numbers from (1) to (3)). Then scanning moves on to the next vertical grid line 3 to read from top to bottom (circled numbers from (4) to (6)). This process is repeated sequentially to read for each grid point.

It should be noted that the above described order of reading for each grid point is to start with the left-most vertical grid line, but it is obvious to set any order of placing and reading information.

Figure 7:
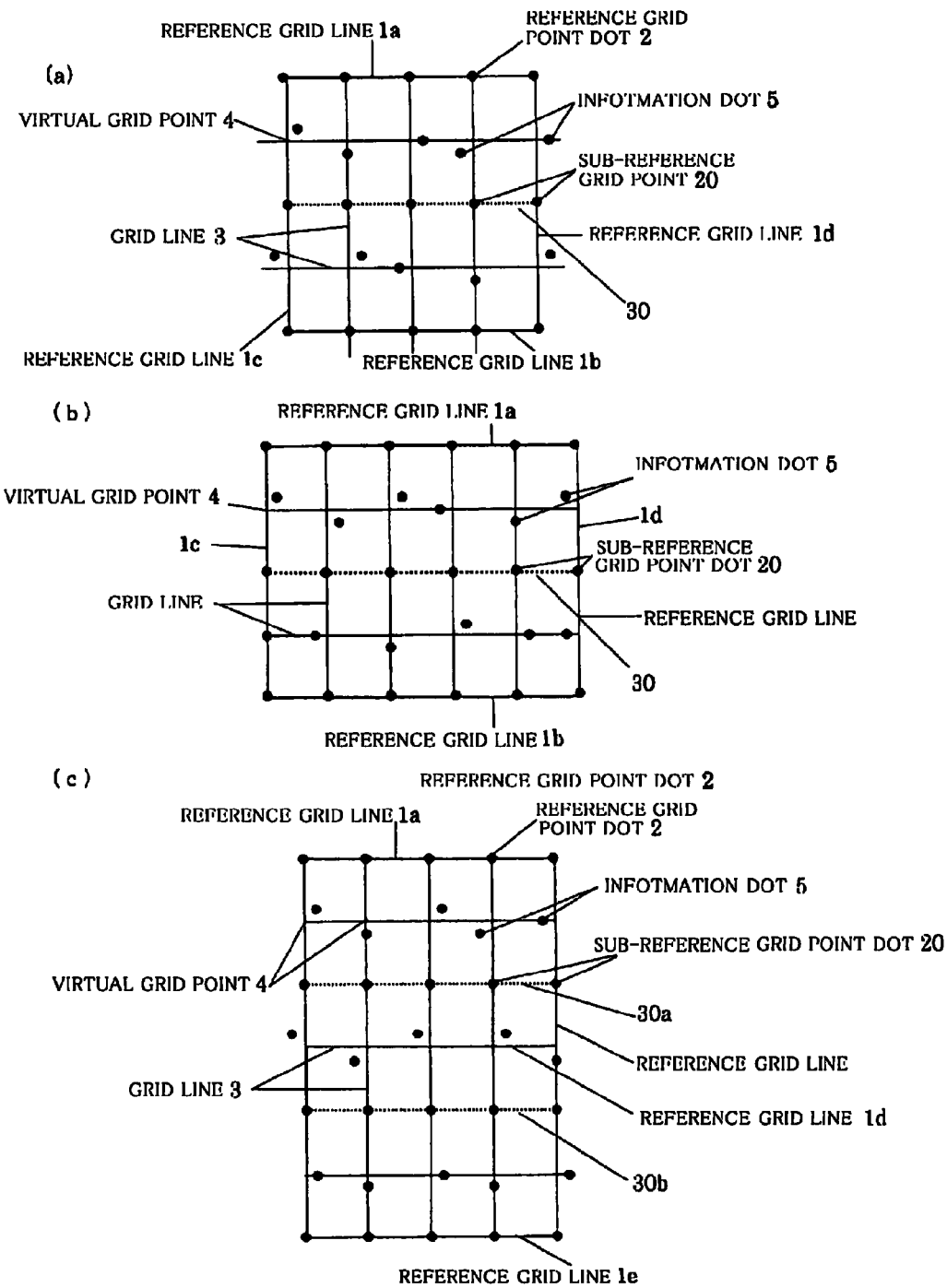
FIG. 7 is a drawing (1), each showing a dot configuration.

With reference to FIG. 7, a grid line 30 is assumed to be drawn in parallel between the upper reference grid line 1a and the lower reference grid line 1b, and a sub-reference grid point dot 20 in stead of an information dot is placed each on this grid line 30.

When a conventional optical reading means reads these dot patterns, the optical reading means starts to scan the upper reference grid line 1a and the lower reference grid line 1b to find reference grid point dots 2. Next, the optical reading means assumes a grid line 3 on a computer, and then assumes a virtual grid point 4 from the grid line 3, and finally determines the distance and length of an information dot 5 on the base of this virtual grid point 4.

However, with an increase in the number of grids between the reference grid lines 1a and 1b, information dot reading errors may occur due to deformations of paper (medium surface) or reading precision of the optical reading means.

However, if a dot (sub-reference grid point dot 20) is placed on every virtual grid point 4 on a grid line 30 placed in the middle between the reference grid lines 1a and 1b as shown in FIGS. 7(a) to (c), these dots can be used as the base of reading. Thus, information dots can be easily read without any reading error even if any deformation occurs in paper (medium surface) or the optical reading means has low precision.

It should be noted that a grid line 30 is placed in an equal distance (equal number of grids) from between the reference grid lines 1a and 1b, but sub-reference grid point dots 20 may be placed on any grid line parallel to the reference grid lines 1a and 1b.

With reference to FIG. 7(b), a sub-reference grid point dot 20 is placed each on a grid line 30 in a 4×5 grid area. With reference to FIG. 7(c), a sub-reference grid point dot 20 is placed each on a grid line 30 in a 6×4 grid area. It should be noted that any number of grids including and exceeding 4×1 grid can be set.

Figure 8:
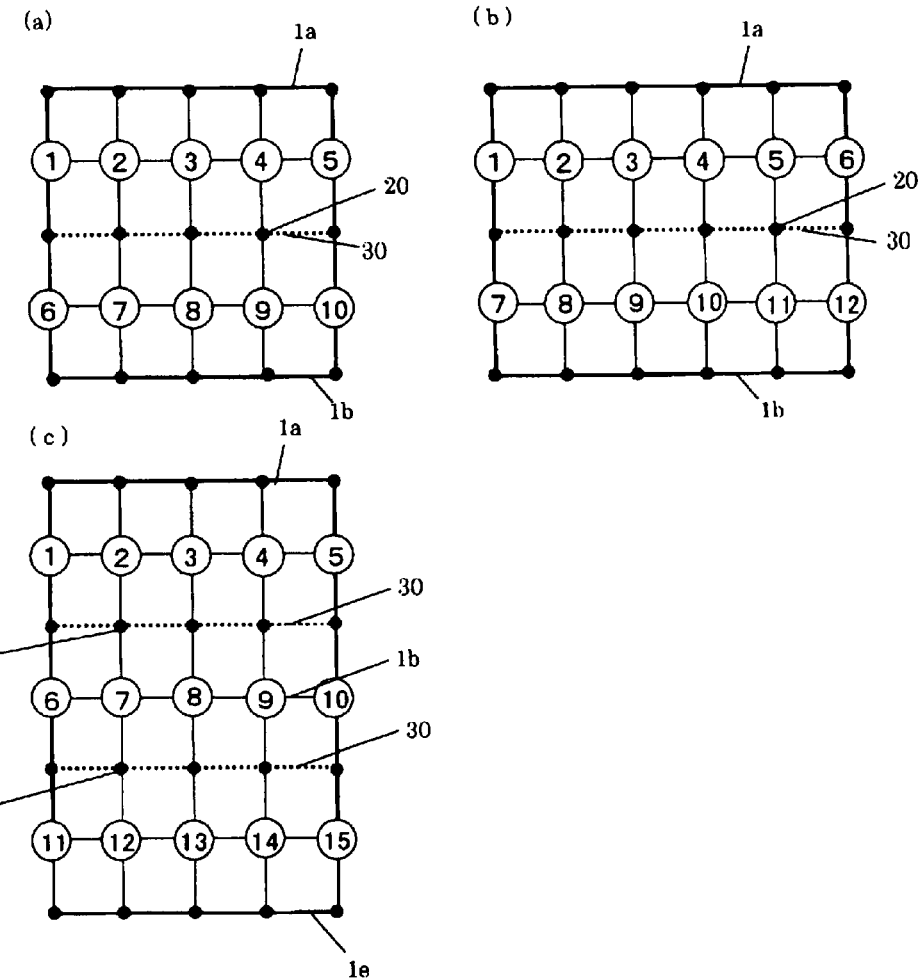
FIG. 8 is an explanatory drawing (2), each showing a dot reading order.
Figure 9:
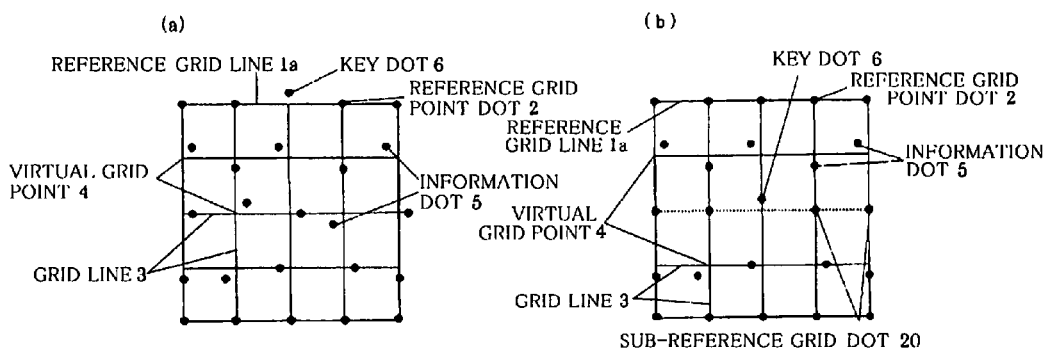
FIG. 9 is a drawing (2), each showing a dot configuration.

FIGS. 8(a) to (c) show the order of reading information dots in a dot pattern having sub-reference grid point dots placed as described in FIG. 7. Circles numbers shown in the FIGS. indicate the order of reading. As shown in these FIGS., sub-reference grid point dots are placed on a grid line C. Thus information dots cannot be placed on grid point portions, but reading precision can be greatly improved as described above, time to calculate information dot values can be reduced, and information dot 5 can be easily read without causing an error. With reference to FIGS. 9(a) and (b), key dots instead of reference grid point dots are placed on virtual grid points on a reference grid line. In FIG. 9(a), a key dot is placed on a position shifted upward from a virtual grid point in a middle position of a reference grid line A. In FIG. 9(b), a key dot is placed on a sub-reference grid point dot on a middle grid line 30.

These key dots can be used to define the direction of a dot pattern.

Figure 10:
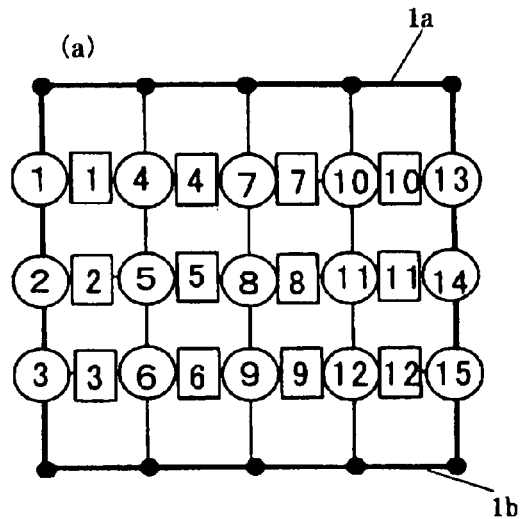
FIG. 10 is an explanatory drawing (1), each showing a dot reading order in a difference method.
Figure 10:
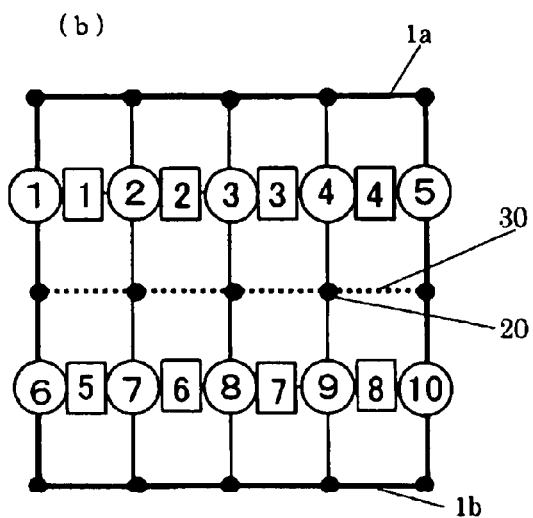

FIG. 10 describes the order of reading information dots using a difference method. Hereinafter, bracketed numbers are indicated by [ ], circled numbers are indicated by ( ).

For example, with reference to FIG. 10(a) showing 4×4 grids, a value [1] is represented by a difference between information dot values (4) and (1).

By the same token, a value [2] is represented by a difference between information dot values (5) and (2), and a value [3] is represented by a difference between information dot values (6) and (3). Values [4] to [12] are represented in a similar manner.

Each of the values [1] to [12] is represented by a difference between information dot values as shown below.

$$[1]=(4)-(1)$$

$$[2]=(5)-(2)$$

$$[3]=(6)-(3)$$

$$[4]=(7)-(4)$$

$$[5]=(8)-(5)$$

$$[6]=(9)-(6)$$

$$[7]=(10)-(7)$$

$$[8]=(11)-(8)$$

$$[9]=(12)-(9)$$

$$[10]=(13)-(10)$$

$$[11]=(14)-(11)$$

$$[12]=(15)-(12) \quad\quad\quad \text{[Mathematical formula 1]}$$

FIG. 10 (b) shows that this difference is represented by 4×2 grids. In this FIG. 10(b), a sub-reference grid point 20 is placed.

Hereinafter, in FIG. 10(b), values [1] to [8] are represented each by a difference between information dots as shown below.

$$[1]=(2)-(1)$$

$$[2]=(3)-(2)$$

$$[3]=(4)-(3)$$

$$[4]=(5)-(4)$$

$$[5]=(7)-(6)$$

$$[6]=(8)-(7)$$

$$[7]=(9)-(8)$$

$$[8]=(10)-(9) \quad\quad\quad \text{[Mathematical formula 2]}$$

This difference method allows a plurality of different dot patterns to be generated from one true value, thereby enhancing security.

It should be noted that not only a difference method but also any formula defined between information dots can be used to calculate a true value.

Figure 11:
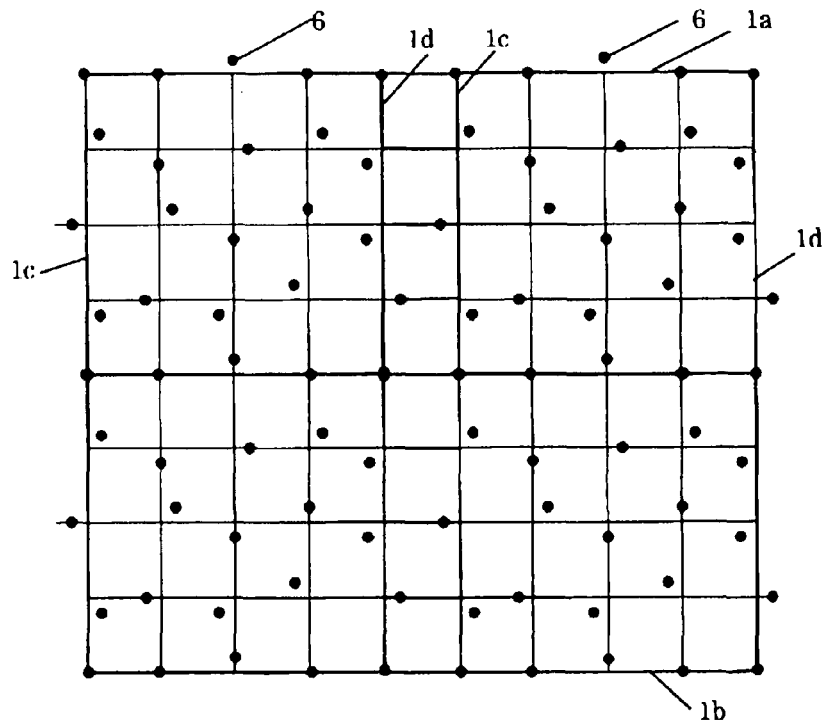
FIG. 11 is a drawing (1), each showing a dot configuration when upper and lower reference dots are shared.
Figure 11:
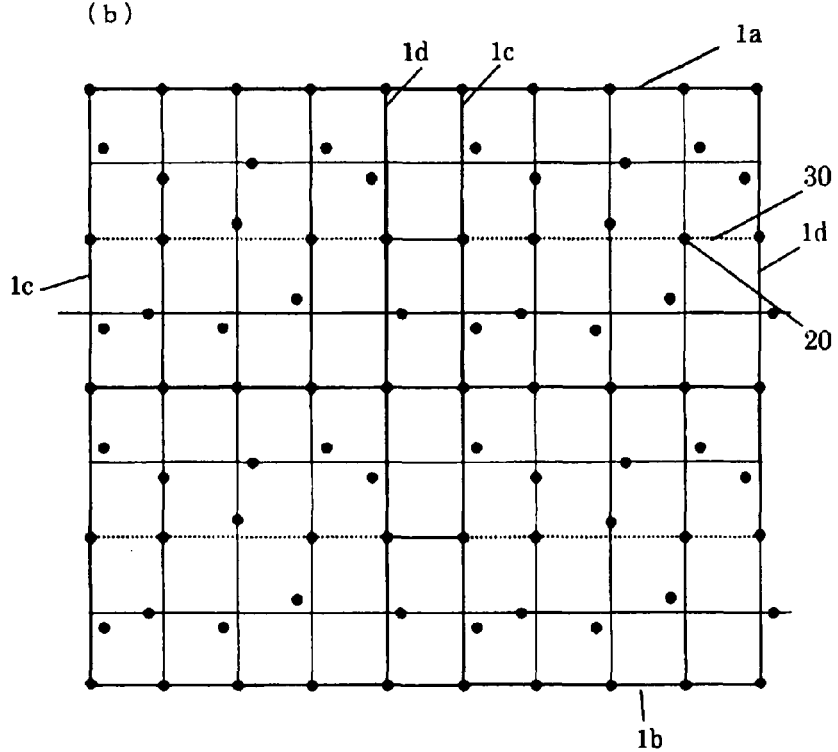

With reference to FIG. 11, reference grid point dots on upper and lower reference grid lines are shared.

With reference to FIG. 11(a), vertical reference grid lines are not shared. In this case, the number of information dots remains unchanged.

With reference to FIG. 11(b), sub-reference grid lines are placed.

Figure 12:
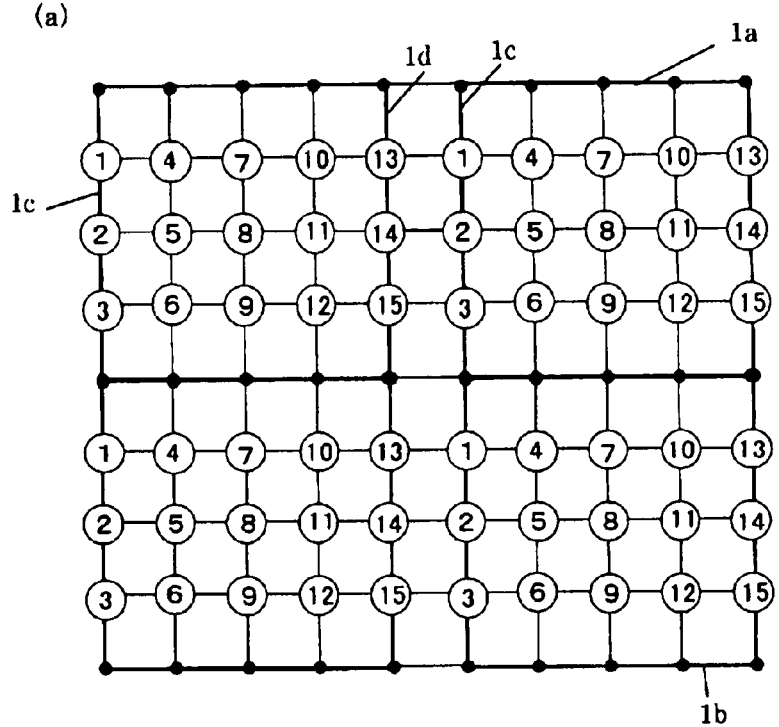
FIG. 12 is an explanatory drawing, each showing a dot reading order corresponding to FIG. 11.
Figure 12:
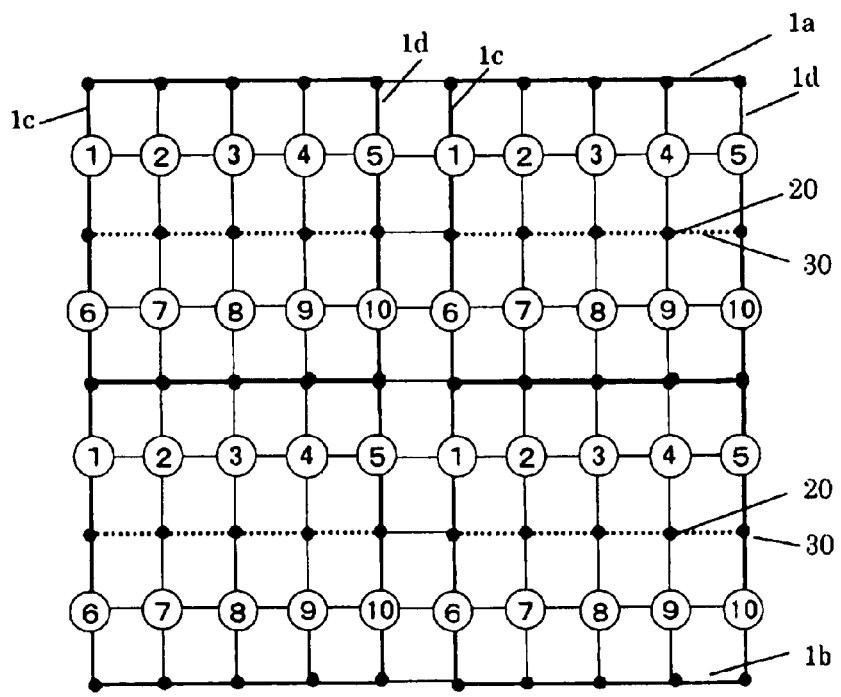

FIG. 12 shows the order of reading information dots corresponding to FIGS. 11(a) and (b).

With reference to FIG. 13(a), a difference method is used to share information dots on vertical reference grid lines with adjacent grids. In this case, random numbers are used for information dots (initial values in a difference) placed on left-most vertical reference grid lines to arrange the subsequent (rightward) dots in irregular positions, thereby preventing visual blurring of a dot pattern.

Figure 13:
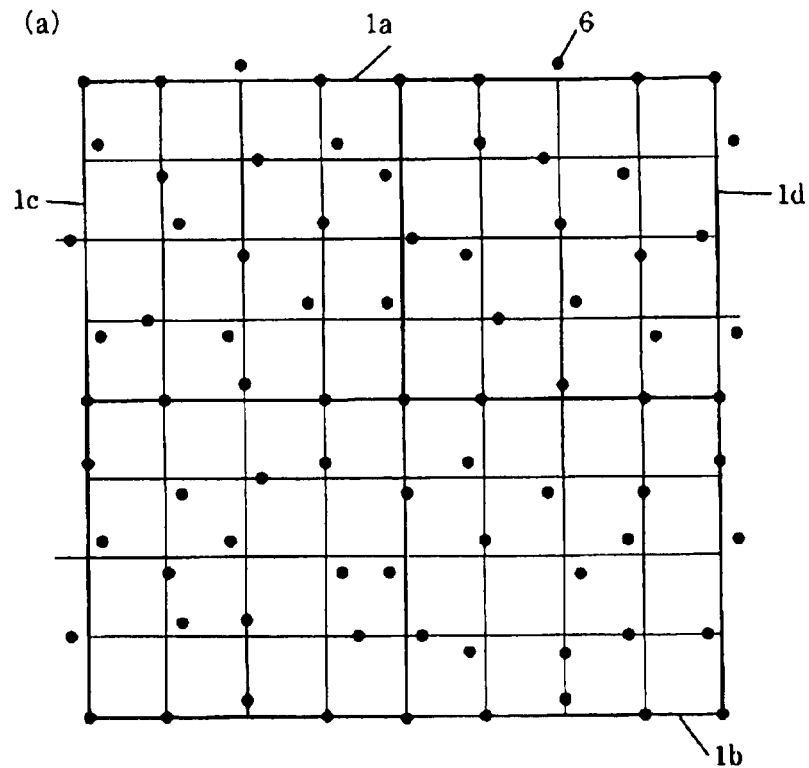
FIG. 13 is a drawing, each showing a dot configuration when an information dot is shared.
Figure 13:
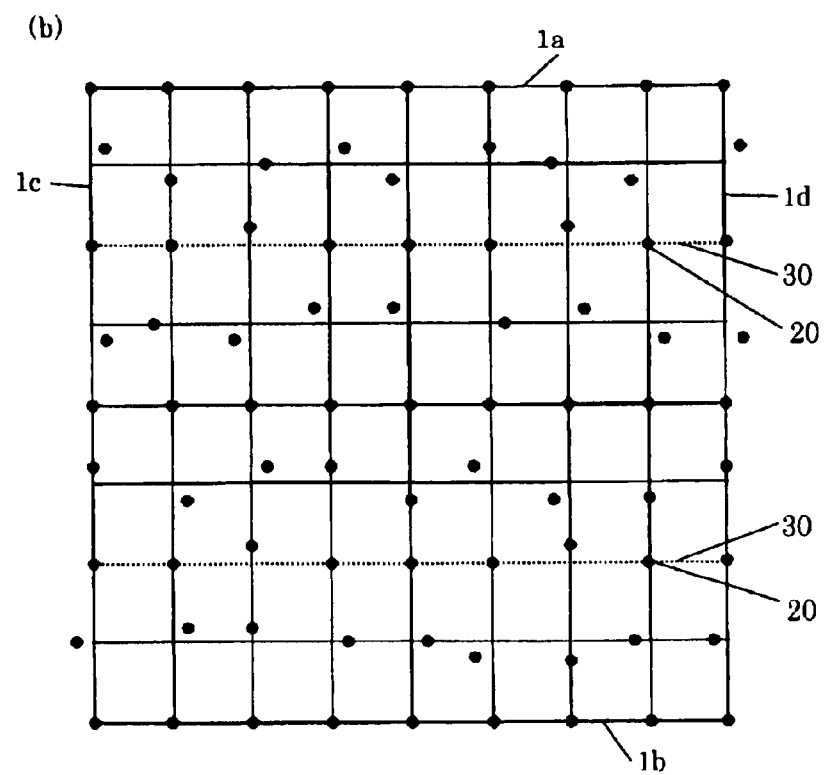

With reference to FIG. 13(b), sub-reference grid point dots are placed on a grid line C in FIG. 13(a). In this case, information dots cannot be placed on grid points, but there are advantages that reading precision is greatly improved and calculation time is reduced. FIG. 14 is an explanatory drawing showing the order of reading information dots corresponding to FIG. 13.

Figure 14A:
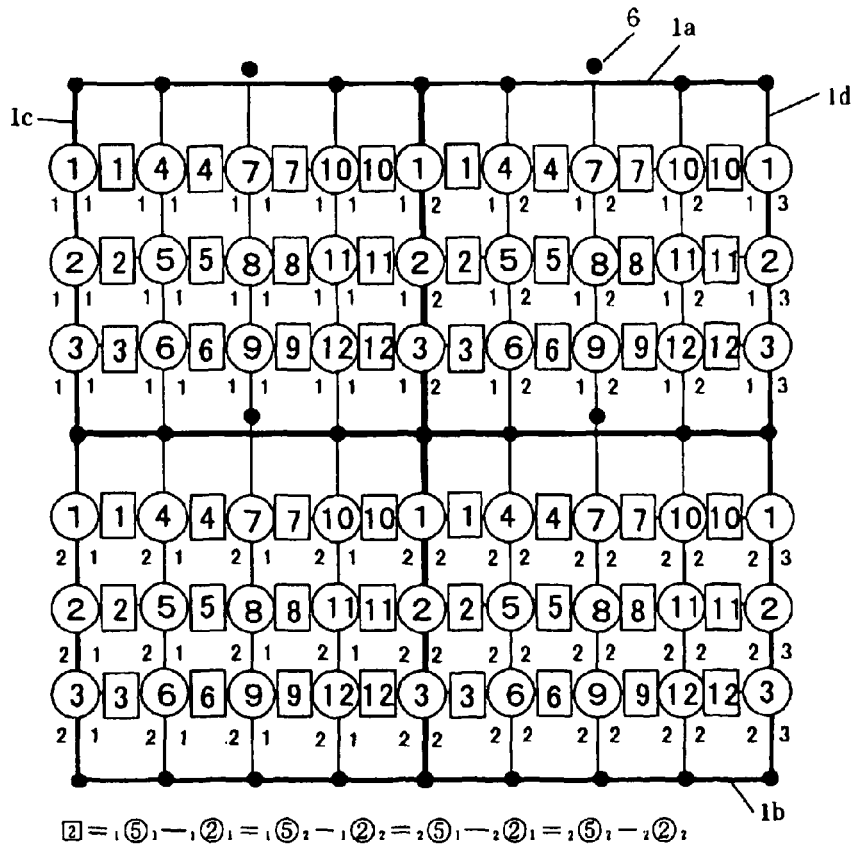
FIG. 14 is a drawing showing a dot reading order and a method of calculating the value by a difference method.

FIG. 14(a) is an example of 4×4 grids, and values [1] to [12] are represented by a difference between information dots as shown below.

$$[1] = {}_1(4)_1 - {}_1(1)_1 = {}_1(4)_2 - {}_1(1)_2 = {}_2(4)_1 - {}_2(1)_1 = {}_2(4)_2 - {}_2(1)_2$$

$$[2] = {}_1(5)_1 - {}_1(2)_1 = {}_1(5)_2 - {}_1(2)_2 = {}_2(5)_1 - {}_2(2)_1 = {}_2(5)_2 - {}_2(2)_2$$

$$[3] = {}_1(6)_1 - {}_1(3)_1 = {}_1(6)_2 - {}_1(3)_2 = {}_2(6)_1 - {}_2(3)_1 = {}_2(6)_2 - {}_2(3)_2$$

$$[4] = {}_1(7)_1 - {}_1(4)_1 = {}_1(7)_2 - {}_1(4)_2 = {}_2(7)_1 - {}_2(4)_1 = {}_2(7)_2 - {}_2(4)_2$$

$$[5] = {}_1(8)_1 - {}_1(5)_1 = {}_1(8)_2 - {}_1(5)_2 = {}_2(8)_1 - {}_2(5)_1 = {}_2(8)_2 - {}_2(5)_2$$

$$[6] = {}_1(9)_1 - {}_1(6)_1 = {}_1(9)_2 - {}_1(6)_2 = {}_2(9)_1 - {}_2(6)_1 = {}_2(9)_2 - {}_2(6)_2$$

$$[7] = {}_1(10)_1 - {}_1(7)_1 = {}_1(10)_2 - {}_1(7)_2 = {}_2(10)_1 - {}_2(7)_1 = {}_2(10)_2 - {}_2(7)_2$$

$$[8] = {}_1(11)_1 - {}_1(8)_1 = {}_1(11)_2 - {}_1(8)_2 = {}_2(11)_1 - {}_2(8)_1 = {}_2(11)_2 - {}_2(8)_2$$

$$[9] = {}_1(12)_1 - {}_1(9)_1 = {}_1(12)_2 - {}_1(9)_2 = {}_2(12)_1 - {}_2(9)_1 = {}_2(12)_2 - {}_2(9)_2$$

$$[10] = {}_1(1)_2 - {}_1(10)_1 = {}_1(1)_3 - {}_1(10)_2 = {}_2(1)_2 - {}_2(10)_1 = {}_2(1)_3 - {}_2(10)_2$$

$$[11] = {}_1(2)_2 - {}_1(11)_1 = {}_1(2)_3 - {}_1(11)_2 = {}_2(2)_2 - {}_2(11)_1 = {}_2(2)_3 - {}_2(11)_2$$

$$[12] = {}_1(3)_2 - {}_1(12)_1 = {}_1(3)_3 - {}_1(12)_2 = {}_2(3)_2 - {}_2(12)_1 = {}_2(3)_3 - {}_2(12)_2$$

[Mathematical formula 3]

Figure 14B:
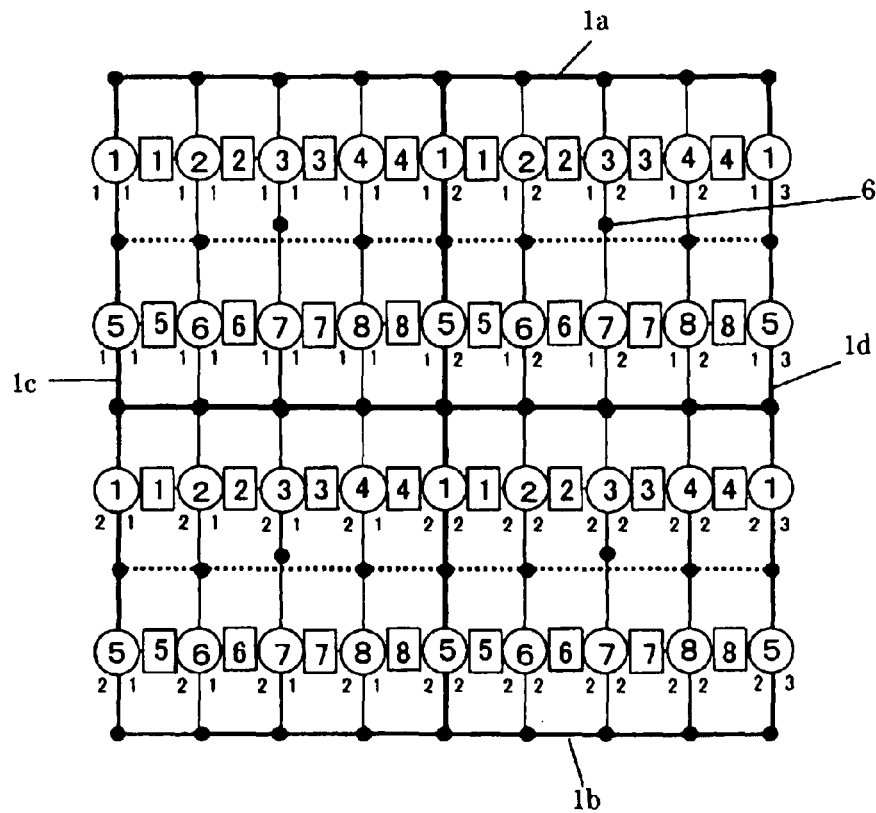

With reference to FIG. 14(b), sub-reference grid points are placed in FIG. 14(a), and values [1] to [8] are represented each by a difference between information dots as shown below.

$$[1] = {}_1(2)_1 - {}_1(1)_1 = {}_1(2)_2 - {}_1(1)_2 = {}_2(2)_1 - {}_2(1)_1 = {}_2(2)_2 - {}_2(1)_2$$

$$[2] = {}_1(3)_1 - {}_1(2)_1 = {}_1(3)_2 - {}_1(2)_2 = {}_2(3)_1 - {}_2(2)_1 = {}_2(3)_2 - {}_2(2)_2$$

$$[3] = {}_1(4)_1 - {}_1(3)_1 = {}_1(4)_2 - {}_1(3)_2 = {}_2(4)_1 - {}_2(3)_1 = {}_2(4)_2 - {}_2(3)_2$$

$$[4] = {}_1(5)_1 - {}_1(4)_1 = {}_1(5)_2 - {}_1(4)_2 = {}_2(5)_1 - {}_2(4)_1 = {}_2(5)_2 - {}_2(4)_2$$

$$[5] = {}_1(6)_1 - {}_1(5)_1 = {}_1(6)_2 - {}_1(5)_2 = {}_2(6)_1 - {}_2(5)_1 = {}_2(6)_2 - {}_2(5)_2$$

$$[6] = {}_1(7)_1 - {}_1(6)_1 = {}_1(7)_2 - {}_1(6)_2 = {}_2(7)_1 - {}_2(6)_1 = {}_2(7)_2 - {}_2(6)_2$$

$$[7] = {}_1(8)_1 - {}_1(7)_1 = {}_1(8)_2 - {}_1(7)_2 = {}_2(8)_1 - {}_2(7)_1 = {}_2(8)_2 - {}_2(7)_2$$

$$[8] = {}_1(5)_2 - {}_1(8)_1 = {}_1(5)_3 - {}_1(8)_2 = {}_2(5)_2 - {}_2(8)_1 = {}_2(5)_3 - {}_2(8)_2$$

[Mathematical formula 4]

Figure 15:
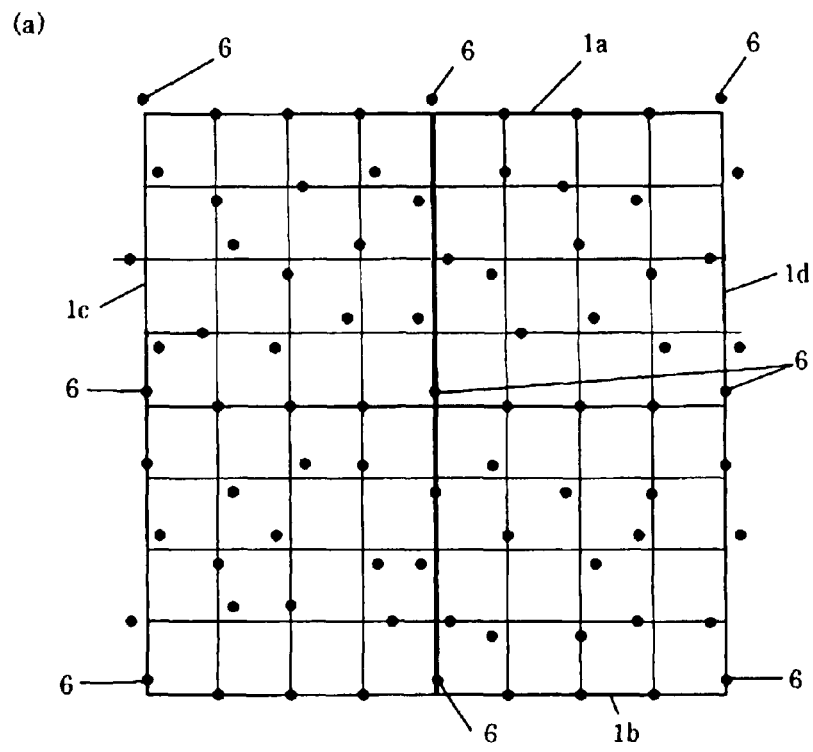
FIG. 15 is a drawing showing a dot configuration corresponding to FIG. 14.
Figure 15:
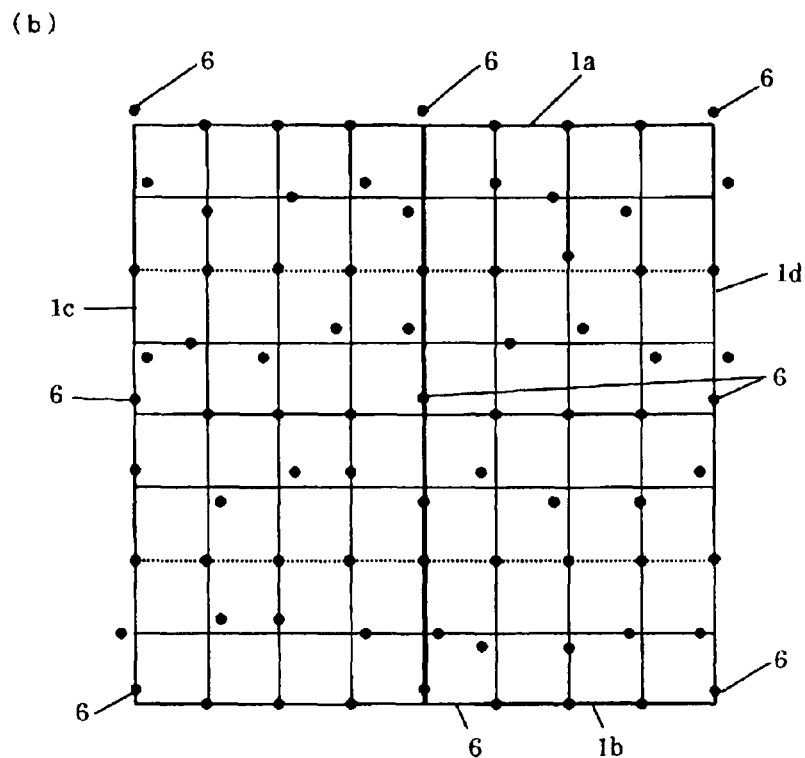

With reference to FIG. 15, a key dot is placed on each of the four corners to define the block.

FIG. 15(a) shows an example of a dot pattern having 4×4 grids, FIG. 15(b) also shows an example of a dot pattern having 4×4 grids with sub-reference grid points.

Figure 16:
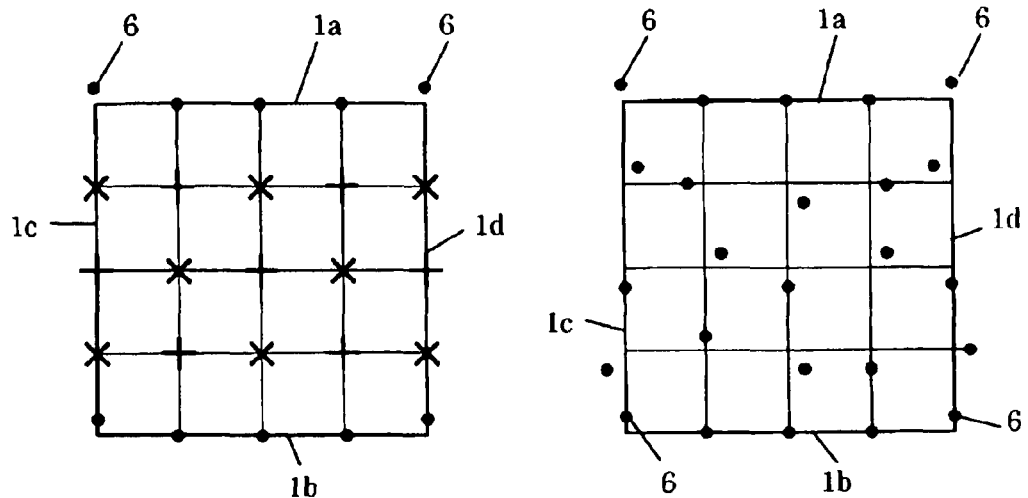
FIG. 16 is a drawing showing an alternative method of placing information dots.
Figure 16:
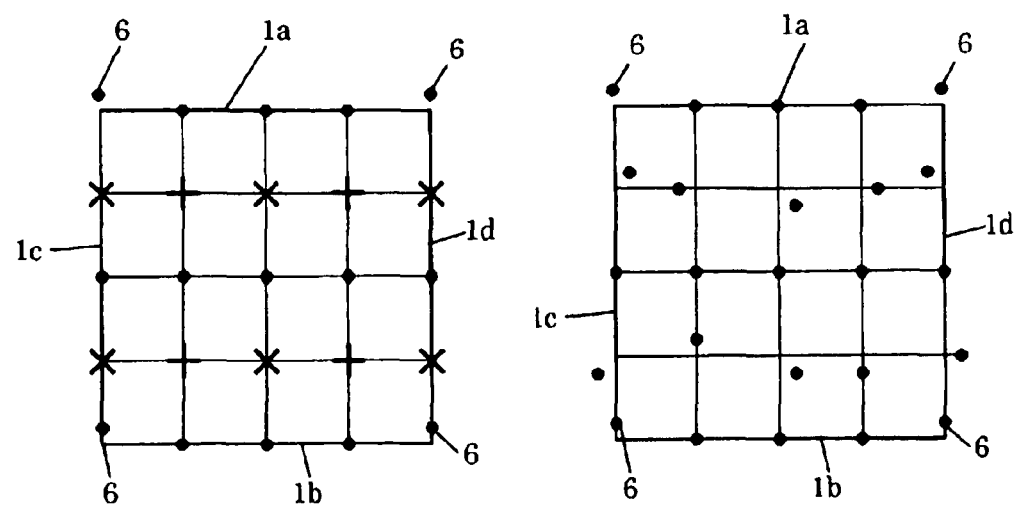

With reference to FIG. 16(a), information dots are placed shifted for each grid in vertical and horizontal directions and in an oblique direction. In this way, distance and direction from a virtual grid point is shifted every one grid to define the dot position, thereby maintaining security based on the positional rule. More specifically, information dots are placed by rigorously defining the position so that only an optical reading means corresponding to this configuration can the read information dots.

With reference to FIG. 16(b), sub-reference grid points are placed in a dot pattern shown in FIG. 16(a).

INDUSTRIAL APPLICABILITY

As described above, according to the information input output method using a dot pattern in accordance with embodiments of the present invention, a virtual grid point is placed at a predetermined interval in an area between the upper and lower reference grid points, and an information dot is placed in a position having a distance and a direction from a virtual grid point to define any information, thereby increasing the amount of information contained in a dot pattern.

In addition, an optical reading means is used to scan a dot pattern and recognize a reference grid point dot and extract a key dot which is used to recognize the direction which can be used as a parameter. Next, an information dot placed between the upper and lower reference grid points is extracted to quickly output information and a program.

In addition, a reference grid point dot or a sub-reference grid point dot is placed in a dot pattern so that deformations of a dot pattern due to camera lens distortion, expansion and contraction of paper, curved surface of a medium, and distortion at the time of printing can be corrected when an optical reading means scans the dot pattern into image data.

Further, a dot configuration error can be checked by defining any information for each information dot in a block by specifying the distance and the direction from a virtual grid point, thereby enhancing security.

What is claimed is:

1. An information output method using a dot pattern, comprising:
   generating a dot pattern, the generating the dot pattern including
   defining quadrangular or rectangular area on a medium surface of a printed material as a block;
   defining a straight line in a vertical direction and a horizontal direction each along an edge of the block as a reference grid line;
   placing a virtual grid point at a predetermined interval on the reference grid line;
   placing a reference grid point dot on a virtual grid point on the horizontal reference grid lines;
   defining a straight line connecting the reference grid point dots and virtual grid points on a vertical line as a grid line;
   defining an intersection point of grid lines as a virtual grid point; and
   arranging one or more information dots having a distance and a direction on the base of the virtual grid point;
   scanning the dot pattern with an optical reader to capture image information corresponding to the generated dot pattern;
   converting the captured image information corresponding to the generated dot pattern into a numerical value;
   storing the numerical value in a storage device; and
   reading and outputting the numerical value from the storage device.

2. An information input output method using a dot pattern, according to claim 1, wherein a sub-reference grid point dot instead of the information dot is placed on the virtual grid point on a grid line which is parallel to the reference grid line horizontal to a reference block and is placed at a predetermined interval from the reference grid line in the block.

3. An information input output method using a dot pattern, according to claim 1, wherein at least one of the reference grid dots or sub-reference grid dots constituting the block is displaced from a virtual grid point and is used as a key dot in which the displacement direction to the block and the configuration of the block are defined.

4. An information input output method using a dot pattern, according to claim 1, wherein a numerical difference between horizontally adjacent information dots in the information dot is calculated into numerical information to output an information group enumerating the numerical information in the block.

5. An information input output method using a dot pattern, according to claim 1, wherein the block is arranged consecutively in any area vertically and horizontally, and the reference grid dot is shared horizontally by each block.

6. An information input output method using a dot pattern, according to claim 4, wherein a reference grid dot and an information dot at left and right ends of the block are shared in a dot pattern placed consecutively in the area, and in the dot pattern in which a numerical difference between horizontally adjacent information dots is calculated to define numerical information between information dots, an initial value of an information dot at a horizontal end in the area is determined by any random number.

7. An information input output method using a dot pattern, according to claim 3, wherein the key dot is placed on at least one of the four corners of a block.

8. An information input output method using a dot pattern, according to claim 1, wherein information in an information dot of the block is defined by using a position of the information dot in the block to arbitrarily limit the distance and the direction from the virtual grid point for each information dot.

9. An information input output method using a dot pattern, according to claim 2, wherein at least one of the reference grid dots or sub-reference grid dots constituting the block is displaced from a virtual grid point and is used as a key dot in which the displacement direction to the block and the configuration of the block are defined.

10. An information input output method using a dot pattern, according to claim 2, wherein a numerical difference between horizontally adjacent information dots in the information dot is calculated into numerical information to output an information group enumerating the numerical information in the block.

11. An information input output method using a dot pattern, according to claim 3, wherein a numerical difference between horizontally adjacent information dots in the information dot is calculated into numerical information to output an information group enumerating the numerical information in the block.

12. An information input output method using a dot pattern, according to claim 2, wherein the block is arranged consecutively in any area vertically and horizontally, and the reference grid dot is shared horizontally by each block.

13. An information input output method using a dot pattern, according to claim 3, wherein the block is arranged consecutively in any area vertically and horizontally, and the reference grid dot is shared horizontally by each block.

14. An information input output method using a dot pattern, according to claim 4, wherein the block is arranged consecutively in any area vertically and horizontally, and the reference grid dot is shared horizontally by each block.

15. An information input output method using a dot pattern, according to claim 5, wherein a reference grid dot and an information dot at left and right ends of the block are shared in a dot pattern placed consecutively in the area, and in the dot pattern in which a numerical difference between horizontally adjacent information dots is calculated to define numerical information between information dots, an initial value of an information dot at a horizontal end in the area is determined by any random number.

16. An information input output method using a dot pattern, according to claim 4, wherein the key dot is placed on at least one of the four corners of a block.

17. An information input output method using a dot pattern, according to claim 5, wherein the key dot is placed on at least one of the four corners of a block.

18. An information input output method using a dot pattern, according to claim 6, wherein the key dot is placed on at least one of the four corners of a block.

19. An information input output method using a dot pattern, according to claim 2, wherein information in an information dot of the block is defined by using a position of the information dot in the block to arbitrarily limit the distance and the direction from the virtual grid point for each information dot.

20. An information input output method using a dot pattern, according to claim 3, wherein information in an information dot of the block is defined by using a position of the information dot in the block to arbitrarily limit the distance and the direction from the virtual grid point for each information dot.

21. An information input output method using a dot pattern, according to claim 4, wherein information in an information dot of the block is defined by using a position of the information dot in the block to arbitrarily limit the distance and the direction from the virtual grid point for each information dot.

22. An information input output method using a dot pattern, according to claim 5, wherein information in an information dot of the block is defined by using a position of the information dot in the block to arbitrarily limit the distance and the direction from the virtual grid point for each information dot.

23. An information input output method using a dot pattern, according to claim 6, wherein information in an information dot of the block is defined by using a position of the information dot in the block to arbitrarily limit the distance and the direction from the virtual grid point for each information dot.

24. An information input output method using a dot pattern, according to claim 7, wherein information in an information dot of the block is defined by using a position of the information dot in the block to arbitrarily limit the distance and the direction from the virtual grid point for each information dot.

\* \* \* \* \*